Patented June 9, 1942

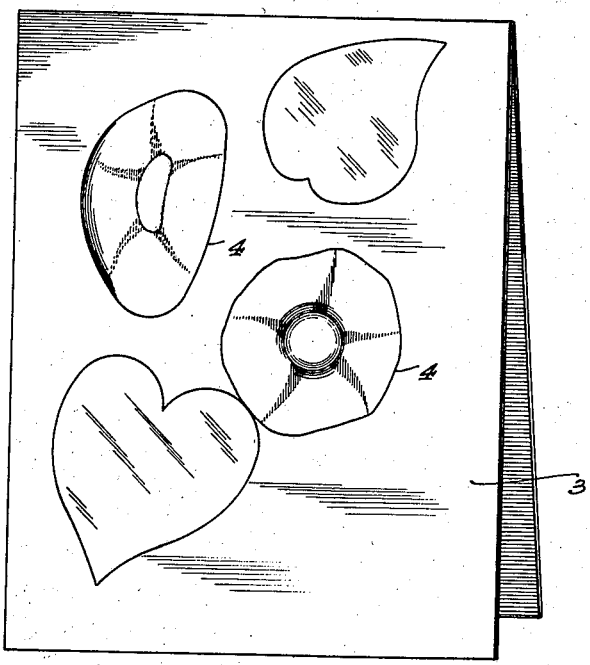
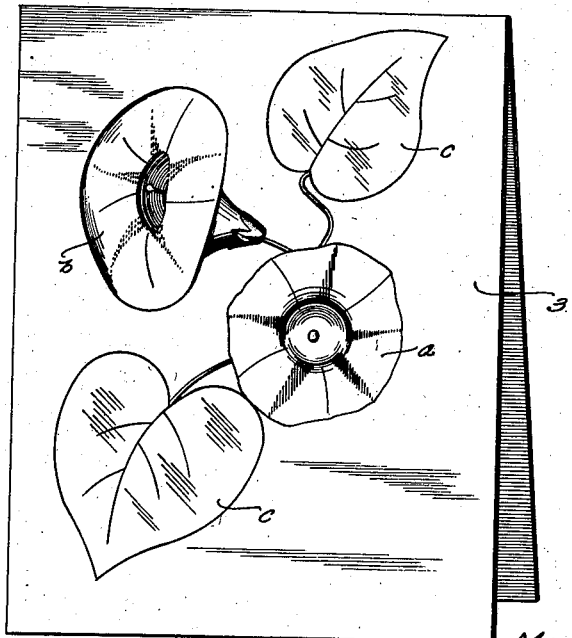

2,285,599

UNITED STATES PATENT OFFICE 2,285,599

DECORATION

Margaret F. Mauro, Washington, D. C.

Application October 18, 1937, Serial No. 169,708

2 Claims. (Cl. 41—26)

This invention relates to a process of forming pictorial representations of plant life—flowers or leaves—and it is based on the discovery that the natural pigments contained in the flowers and leaves of plants can be used directly, that is without any preparatory processing, for making colored pictures.

Broadly the invention comprises a process whereby the natural juices of living flowers and plants are used directly, without admixture or alteration, for decorative purposes—as, for example, the depicting of flowers or other designs upon paper or textiles; the result being a lifelike and permanent reproduction of the natural colors of the original flowers or plants.

The process, which is appropriately designated the "natural pigment" process, has the obvious advantage of effecting substantial economy of time and materials, in comparison with the use of water colors for a like purpose. It is also apparent that, where the natural pigment is used for making a picture of the particular plant element (flower or leaf) from which it was derived, the coloring of the picture will be identically that of the original. But other advantages are attendant upon the process that are not so obvious. For example, it is found that these natural pigments, directly expressed from the plant element, form indelible pictures on ordinary drawing paper or other suitable fabric, which gives them a decided advantage over water colors.

Furthermore, it is found that these natural vegetable pigments have the singular property in drying of effecting what may be termed "self-shading." That is to say, the surface of the pictorial representation of a flower (such for example as a common morning-glory), when made as hereinafter described, tends to assume spontaneously the shading of the natural flower, the tint appearing deeper in some places than in others, in such a way as to indicate the natural contours of the blossom. Furthermore, the effect is heightened by the fact that the pigment thus applied automatically takes on many variations of hue; a purple blossom, for example, exhibiting a variety of tints ranging from blue to deep violet. Thus no additional shading or retouching of the main part of the flower is required. In the case of the morning-glory, only a few strokes indicating the natural stripes need be added. The leaves can often be left as first applied; or, if preferred, a few veins can be added. And not only so, but the surface of the picture thus made presents a more life-like appearance than the most skillfully painted water color.

This process is particularly adapted to painting on textiles, especially linens, since the pigments do not run in the fabric as much as other colors tend to do; and can bear washing with soap and water.

It is obvious that the invention may be carried out in practice in various ways within the scope thereof. As an example of a preferred method which gives excellent results, I will describe the production of a colored design for a greeting card, having a pictorial representation of morning-glory blossoms, reference being made to the accompanying drawing, wherein—

Figure 1 shows in outline a design comprising several morning-glory blossoms and leaves at the first stage of the process; and Figure 2 is a similar view showing the same design substantially completed.

Two blossoms $a$ and $b$ are shown; blossom $a$ being turned almost directly towards the observer, blossom $b$ being turned about ninety degrees to one side.

The blossoms as well as the leaves can, of course, be outlined in pencil before applying the pigment; but this is not necessary, for with a little skill and practice the pigment can be properly applied without a pencil outline of the object, and when so done, time and effort are saved and the resulting picture has a more life-like appearance than one made by the aid of a pencil outline.

In either case a natural blossom, held say by the thumb and first two fingers, is pressed against the sheet 3 of paper or other textile with such force as to cause the juice of the blossom to exude, and is moved rapidly over the surface of the sheet so as to form the ring 4, which in the case of blossom $a$ is approximately circular and in the case of blossom $b$ is oblate in form.

The leaves $c$ are similarly formed, only in this case a natural leaf, preferably that of the plant to be depicted, is used as described above for the supply of the pigment, which in this case will be green.

The main part of the picture, which is thus formed by direct application of the plant elements to the background with pressure sufficient to express the colored juices thereof, has the appearance indicated in Fig. 1. Only a few strokes with a brush to indicate the natural markings are then needed to complete the picture. When these are supplied—the work of a few minutes—the picture assumes the appearance indicated in Fig. 2.

The background may be the color of the sheet of paper or other fabric upon which the picture is made; or, as indicated by shade lines, it may be of any desired color applied with a brush.

The phrase "natural vegetable pigment," as used in the appended claims, signifies a pigment of vegetable origin, which, having been applied to the paper or other background while dissolved in its own natural solvent, is of the same chemical composition and in the same physical condition as when in the plant of its origin. Such natural pigment, therefore, differs radically from all artificially produced pigments, whether oil or water colors; and it follows that paintings made with natural vegetable pigments by the process herein described differ basically, and are readily distinguished by the eye as also by simple tests, from paintings made with manufactured pigments of whatever sort.

Reference has been made above to some of the distinctive characteristics of paintings made with the natural pigments (e. g. their indelibility, property of self-shading and variations of tint). Furthermore, said paintings exhibit a pronounced aliveness, or natural brilliancy, not possessed by artificially produced colors; and the natural vegetable pigments yield spontaneously a profusion of intermediate or "off" shades of practically endless variety. This phenomenon is due partly to the fact that the pigments come already blended in their natural solvents, and partly to the directness of the process. But whatever the cause, these various color-tones, which are unpredictable (no two petals or leaves being exactly alike) is a marked characteristic of the natural pigment pictures, whereby they can be distinguished from all kinds of paintings heretofore known.

What is claimed is:

1. Process of forming a colored pictorial representation of an object, by applying a living plant element to the surface on which the picture is to be formed and moving it in contact with said surface under pressure sufficient to express the liquid pigment therefrom.

2. Process of forming a colored representation of plant life by applying to a suitable surface a living plant element and moving it in contact with said surface under pressure sufficient to express the liquid pigment therefrom and in such wise as to form an image of the plant element from which the said pigment is expressed.

MARGARET F. MAURO.